(12) United States Patent
Perrut

(10) Patent No.: US 6,821,429 B2
(45) Date of Patent: Nov. 23, 2004

(54) METHOD AND DEVICE FOR CAPTURING FINE PARTICLES BY TRAPPING IN A SOLID MIXTURE OF CARBON DIOXIDE SNOW TYPE

(75) Inventor: Michel Perrut, Nancy (FR)

(73) Assignee: Separex, Champigneulles (FR)

( * ) Notice: Subject to any disclaimer, the term of this patent is extended or adjusted under 35 U.S.C. 154(b) by 40 days.

(21) Appl. No.: 10/149,641

(22) PCT Filed: Dec. 15, 2000

(86) PCT No.: PCT/FR00/03557

§ 371 (c)(1),
(2), (4) Date: Jun. 13, 2002

(87) PCT Pub. No.: WO01/43845

PCT Pub. Date: Jun. 21, 2001

(65) Prior Publication Data

US 2002/0179540 A1 Dec. 5, 2002

(30) Foreign Application Priority Data

Dec. 15, 1999 (FR) .......................................... 99 15832

(51) Int. Cl.[7] .............................................. B01D 11/02
(52) U.S. Cl. ...................... 210/634; 210/768; 210/798; 239/8; 264/12

(58) Field of Search .................................. 210/411, 511, 210/634, 638, 639, 702, 791, 644, 768, 774, 797, 798, 649; 264/5, 7, 11–13; 239/8–10; 424/400, 450, 489, 490

(56) References Cited

U.S. PATENT DOCUMENTS

| | | | | |
|---|---|---|---|---|
| 5,043,280 A | * | 8/1991 | Fischer et al. | ............ 435/235.1 |
| 5,833,891 A | * | 11/1998 | Subramaniam et al. | ........ 264/7 |
| 5,851,453 A | * | 12/1998 | Hanna et al. | .................. 264/5 |
| 6,063,910 A | * | 5/2000 | Debenedetti et al. | ....... 530/418 |

* cited by examiner

Primary Examiner—Joseph Drodge
(74) Attorney, Agent, or Firm—Dechert, LLP; John W. Ryan

(57) ABSTRACT

The invention concerns a method for capturing very fine particles present in a fluid flux in liquid, gaseous or supercritical state and a device therefor. The method is characterized in that it comprises steps which consist in: causing said flux to pass through a filtering element (13); stopping the emission of said flux; countercurrent clearing of the filtering material (31) with a carbon dioxide flow under pressure, so as to drive the particles deposited on the filtering material (31); countercurrent expanding of the flux, so as to trap the particles within a solid carbon dioxide snow-type mixture formed during its expansion.

7 Claims, 2 Drawing Sheets

Figure 1:
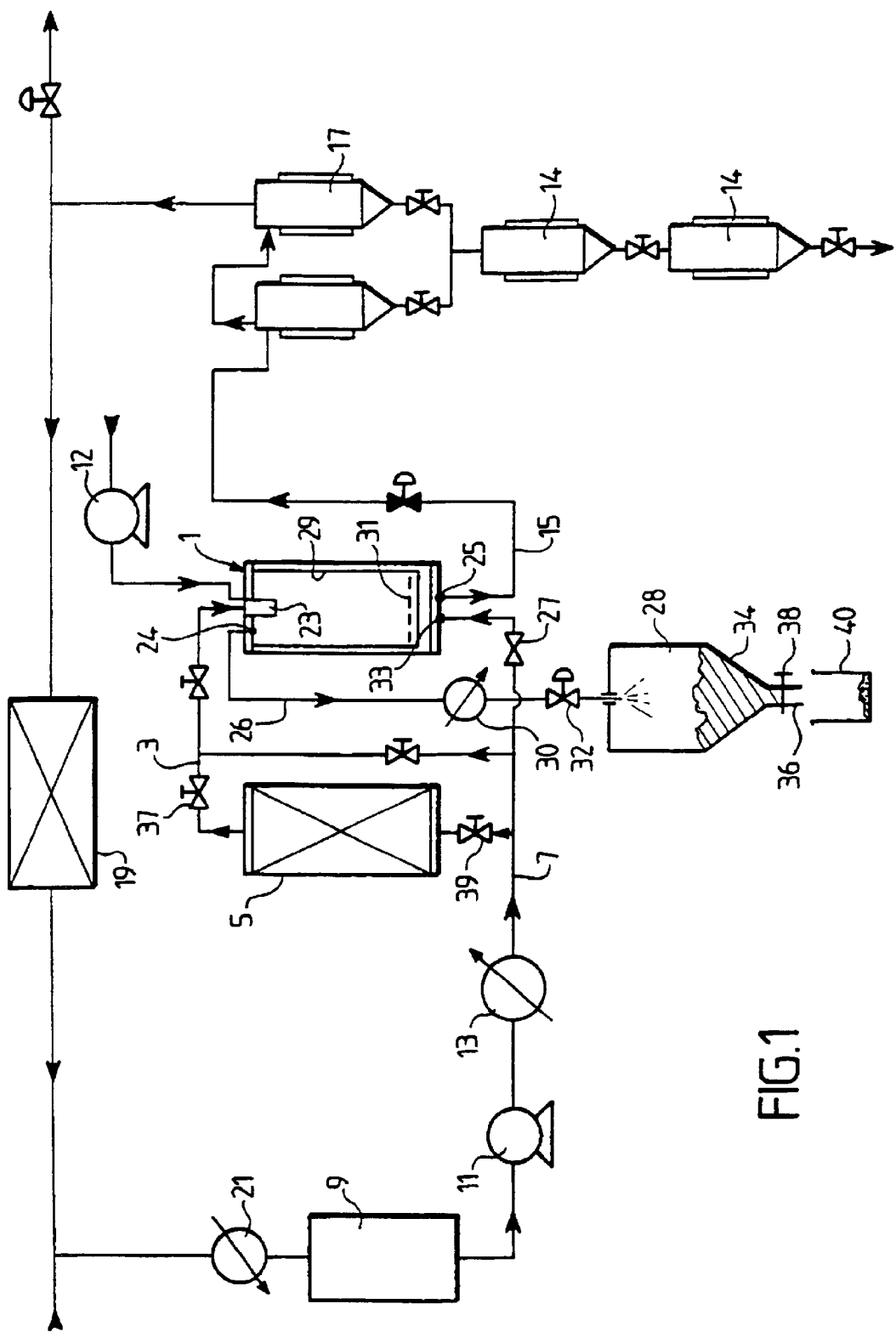

METHOD AND DEVICE FOR CAPTURING FINE PARTICLES BY TRAPPING IN A SOLID MIXTURE OF CARBON DIOXIDE SNOW TYPE

The present invention relates to a method for ensuring capture of solid particles of great fineness, as well as to a device for carrying out this method.

Numerous industries use solids in pulverulent form. This is particularly the case of industries manufacturing paints, cosmetic and dermatological products, and pharmaceutical products. For example, the pharmaceutical industry, but also the cosmetics industry, requires novel galenic forms in order to improve the service rendered by the molecules of therapeutic or dermatological interest. In particular, it is seeking the means for effecting a rapid dissolution of these molecules, which are in the form of solid powder under usual conditions, within biological fluids such as blood or lymph. To that end, it is necessary either to modify the morphology of the solid, or to reduce the granulometry of the powder very considerably, or to combine these two actions. Numerous works are also carried out with a view to elaborating complex medicaments allowing a slow and regular absorption of the active molecule (delayed-action drug).

It is known, by numerous Patents and scientific publications, that microparticles can be obtained, with a granulometry generally included between 1 mm and 10 mm, and nanoparticles with a granulometry generally included between 0.1 mm and 1 mm, by using different methods of crushing or precipitation including, in particular, those employing supercritical fluids, the particles thus generated in that case being dispersed either in a liquid phase or in a gaseous phase, compressed or not, or in a supercritical fluid. Capturing of these particles is an operation which is always difficult, whatever the medium within which they are dispersed.

Supercritical fluids, and particularly supercritical carbon dioxide, are widely used to produce very fine powders capable of dissolving very rapidly by ingestion through the respiratory tracts. Supercritical fluids are also used for obtaining complex particles constituted by mixtures of different morphologies of the active principle and of an excipient, such as microspheres or microcapsules.

It will firstly be recalled what such a supercritical fluid is.

In effect, it is known that bodies are generally known in three states, namely solid, liquid or gaseous and one passes from one to the other by varying the temperature and/or the pressure. Now, there exists a point beyond which one can pass from the liquid state to the gas or vapour state without passing through a boiling or, inversely, through a condensation, but continuously: this point is called the critical point.

It is also known that a fluid in supercritical state, i.e. a fluid which is in a state characterized either by a pressure and a temperature respectively higher than the critical pressure and temperature in the case of a pure body, or by a representative point (pressure, temperature) located beyond the envelope of the critical points represented on a diagram (pressure, temperature) in the case of a mixture, presents, for very numerous substances, a high solvent power with no comparison with that observed in this same fluid in the state of compressed gas. The same applies to so-called "subcritical" liquids, i.e. liquids which are in a state characterized either by a pressure higher than the critical pressure and by a temperature lower than the critical temperature in the case of a pure body, or by a pressure greater than the critical pressures and a temperature lower than the critical temperatures of the components in the case of a mixture (cf. the article by Michel PERRUT—Les Techniques de l'Ingénieur (Engineering Techniques) "Extraction by supercritical fluid, J 2 770-1 to 12, 1999").

The considerable and modulatable variations of the solvent power of the supercritical fluids are, furthermore, used in numerous methods of extraction (solid/fluid), of fractionation (liquid/fluid), of analytical or preparative chromatography, of treatment of materials (ceramics, polymers) and of particle generation. Chemical or biochemical reactions are also made in such solvents. It should be noted that the physico-chemical properties of carbon dioxide as well as its critical parameters (critical pressure: 7.4 MPa and critical temperature: 31° C.) make it the preferred solvent in numerous applications, all the more so as it does not present any toxicity and is available in very large quantities at very low price. Non-polar solvent, carbon dioxide taken to supercritical pressure sometimes has a co-solvent added thereto, constituted in particular by a polar organic solvent whose function is considerably to modify the solvent power, especially with respect to molecules presenting a certain polarity, ethanol often being used to that end. However, certain compounds are more favourably extracted by a light hydrocarbon having from 2 to 5 carbon atoms, and more favourably, from 2 to 4 carbon atoms, at supercritical pressure.

Among the methods allowing very fine particles to be obtained by means of a fluid at supercritical pressure, the method known under the designation of "RESS" will be particularly retained, according to which a solution of the product to be atomized is expanded very rapidly in a supercritical fluid, and the anti-solvent method of the type of the so-called "SAS", "SEDS", "PCA", "ASES" methods, consisting in pulverizing a solution of the product in an organic or aqueous solvent within a stream of fluid in supercritical state.

These methods allow a powder to be obtained, formed by very fine particles which are dispersed within a gaseous stream at low pressure (RESS method) or at high pressure (SAS method). Other methods known in the prior state of the art also make it possible to generate very fine particles within a liquid, by precipitation, by recrystallisation or by mechanical crushing action.

The collection of these particles is then a very delicate operation, especially when it is desired that productions be large-scale.

Various methods allowing fine particles to be collected within a liquid or gaseous stream, are, of course, known. The most currently used ones are those employing filters constituted by woven or non-woven filtering materials which make it possible to capture the finest particles including those whose diameter is included between 0.1 $\mu$m and 1 mm.

The filters also present a notorious drawback, insofar as the recovery of the particles that they have fixed as well as their possible subsequent re-use, are operations which are particularly difficult to carry out as long as it is desired to respect the rules imposed in the pharmaceutical industry.

The present invention has for its object to propose a method, as well as means for carrying out this method, making it possible easily to capture such particles and which, in addition, lend themselves to continuous operation on an industrial scale.

The present invention thus has for its object a method for capturing very fine particles present in a fluid flux in the liquid, gaseous or supercritical state, characterized in that it comprises the steps consisting in:

causing said flux to pass through a filtering element;
stopping the emission of said flux;
countercurrent sweeping the filtering material with a carbon dioxide flow under pressure, so as to entrain the particles deposited on the filtering material;
countercurrent expanding the flux, so as to trap the particles within a solid carbon dioxide snow-type mixture formed during its expansion.

The carbon dioxide flux used during sweeping will in particular be at a supercritical pressure. Furthermore, it may be advantageous to cool the carbon dioxide flow circulating in countercurrent, before expansion, so as to increase the quantity of solid of carbon dioxide snow type generated during the subsequent expansion.

In a form of embodiment of the invention, in which the particles will have been generated with the aid of a method employing an organic solvent, particularly of anti-solvent type, there will be percolated, in the normal direction of the flux, the particles collected by the filtering element with a fluid at supercritical pressure, before effecting the countercurrent sweeping, in order to eliminate the solvent present on and in the particles.

By a simple evaporation of the solid mixture, the invention makes it possible easily to obtain a dry and non-agglomerated powder.

The invention is also advantageous from an industrial standpoint, as it makes it possible successively and periodically to send the flux of fluid within which the particles are dispersed, towards a plurality of capture chambers, the particle production operation itself being conducted continuously.

The present invention also has for its object a device for capturing fine particles contained within a flux of liquid, gaseous or supercritical fluid, characterized in that it comprises:

at least one capture chamber comprising means for admission of said flux, means for receiving the particles contained in the flux, means for injecting in the capture chamber, through the receiving means, a flow of carbon dioxide under pressure in countercurrent with respect to the preceding flux, means for placing the capture chamber in communication with a receptor chamber with the interposition of means for effecting an expansion of the flux in countercurrent, in the receptor chamber.

The capture device may comprises a plurality of capture chambers and commutation means making it possible to connect in turn each of these chambers to particle production means.

The means for receiving the particles may be constituted by filtering elements comprising, for example, going in the normal direction of the flux, a disc made of perforated metal, a filter made of microfibers and a disc of sintered material of greater porosity.

Forms of embodiment of the present invention will be described hereinafter by way of non-limiting example, with reference to the accompanying drawings, in which:

FIG. 1 schematically shows an installation for producing particles and a capture device according to the invention.

FIG. 2 is a diagram showing the detail of the means for capturing the particles employed in the installation shown in FIG. 1.

FIG. 3 is a partial diagram showing a variant embodiment of capture means according to the invention.

FIG. 1 shows an installation for producing and a device for capturing extra-fine particles according to the invention, which is able to function in particular in accordance with two modes, namely a so-called anti-solvent production mode and a so-called RESS production mode.

The installation comprises an atomization chamber 1, formed by a pressure-resistant tubular enclosure, of which the upper part comprises an injection nozzle 23 and which contains a cylindrical basket 29 of which the bottom is formed by filtering elements 31 constituted by a disc of high porosity made of sintered metal (of the order of 50 $\mu$m) and by a support disc made of perforated metal between which a filtering material of very low porosity (of the order of 1.2 $\mu$m) is arranged.

The upper part of the atomization chamber 1 is supplied with carbon dioxide at supercritical pressure through the nozzle 23 connected to a pipe 7 in communication with a storage reservoir 9 via a diaphragm pump 11, an exchanger 13 and a valve 27 and the lower part of this chamber is connected by a pipe 15 to cyclone separators 17, of which the upper part is in communication with the storage reservoir 9 via an absorbent bed 19 and a condenser 21 and the lower part is connected to drawing-off means 14. The atomization chamber 1 may also be supplied with carbon dioxide under pressure through an inlet 33 located in its lower part.

When the installation functions in so-called anti-solvent particle generation mode, the nozzle 23 is directly supplied through the pipe 7. In this form of embodiment, a solution in an organic or aqueous solvent of the product to be atomized is sent into the spray nozzle 23 by a pump 12.

When the installation functions in so-called RESS particle generation mode, the pipe 7 supplies fluid at supercritical pressure by its base to an extractor 5 whose upper outlet supplies the nozzle 23 through a pipe 3.

The atomization chamber 1 comprises an outlet 24 which is connected to means for capturing the particles. These capturing means are constituted by a pipe 26 which is connected to a receptor chamber 28 of large volume, with the interposition of a heat exchanger 30 and a regulation valve 32. The receptor chamber 28 comprises a conical bottom 34 which opens on a pipe 36 whose passage is controlled by a valve 38.

The overall functioning of the installation will firstly be described, then the specific functioning of the means for capturing the particles.

If the installation functions in accordance with the RESS technique, the product which it is desired to atomize is arranged in the extractor 5 and there is percolated therein a fluid at supercritical pressure, constituted in particular by carbon dioxide, which is stored in the reservoir 9. The fluid is taken to the working pressure by the diaphragm pump 11 and to the working temperature by the heat exchanger 13. The fluid at supercritical pressure having dissolved a certain concentration of the product, it is admitted through the pipe 3 in the atomization chamber 1 through the spray nozzle 23, where it expands, so that the generated particles are fixed on the filtering material 31. When it is estimated that the quantity of particles deposited thereon is sufficient, the generation of particles is stopped.

A flux of fluid at supercritical pressure is then injected into the atomization chamber 1, through the inlet 33, so as to percolate the filtering material 31 in countercurrent with respect to the previous direction, so as to entrain the particles deposited thereon towards its outlet 24.

The particle-laden fluid at supercritical pressure is cooled to low temperature through the heat exchanger 30 and is then suddenly expanded by the regulation valve 32 in the receptor chamber 28 to a pressure close to atmospheric pressure. It is then transformed in part into carbon dioxide snow within which the particles are trapped.

This carbon dioxide snow may be easily stored, by any known means, in appropriate, well heat-insulated recipients. As a function of the users' needs, this particle-laden carbon dioxide snow may either be transformed into carbonic ice by compression in a press in order to be stored in a small volume, or stored as such for a short period as a function of needs. It may also be subjected to slow reheating with vaporization of the snow. It is in that case observed that a dry powder, well dispersed without agglomerate, is obtained.

As has been said hereinbefore, this method of capturing is applied to any type of generation of particles and in particular to the anti-solvent method using a fluid at supercritical pressure.

In this case, use is not made of the extractor 5 which is short-circuited by valves 37 and 39 and the product which it is desired to atomize is dissolved in a solvent and the whole is pulverized in the atomization chamber 1 by means of the pump 12, as shown in FIG. 1. In this form of embodiment of the invention, the particles deposited on the filtering material 31 will be stripped by a flux of fluid at supercritical pressure sweeping the atomization chamber 1, so as to entrain the solvent adsorbed on the particles before admitting the fluid at supercritical pressure in countercurrent, as set forth hereinabove.

The method of capturing according to the invention is particularly advantageous for any heat-sensitive or thermo-labile product and, in the first place, for biological products.

This method is also advantageous from an industrial standpoint insofar as, contrary to the capturing methods of the prior state of the art, it does not impose, for recovering the particles, opening the atomization chamber 1 and manipulating the filtering means. Furthermore, it has been observed that the fact of working continuously made it possible to obtain very homogeneous batches of products unlike those obtained according to the prior state of the art, i.e. conventional functioning in batches.

EXAMPLE 1

The installation described hereinabove was used for extracting caffeine by carbon dioxide at supercritical pressure and for generating fine particles by expansion of this fluid according to the RESS technique. In this form of embodiment of the invention, an atomization chamber 1 was used, of cylindro-conical shape with a volume of twenty liters, perfectly heat-insulated by a cryogenic insulant. This chamber 1 was provided with a cylindrical basket 29 closed at its base by filtering means respectively constituted from bottom to top by a disc of sintered metal with a porosity of 50 $\mu$m, a filter of non-woven glass microfibers with a porosity of 1.2 $\mu$m, and a disc of metal perforated with holes of 2 $\mu$m diameter with an open surface portion of 80%, the two metal discs ensuring mechanical hold of the filter.

The extraction by carbon dioxide was effected at a pressure of 30 MPa, a temperature of 60° C. and a flowrate of 14 kg/hr., the pressure prevailing in the atomization chamber 1 being 0.12 MPa.

Production of particles was stopped after 60 minutes, then the carbon dioxide at supercritical pressure was admitted in countercurrent in the atomization chamber 1 by opening the valve 27. Then, as described hereinbefore, the fluid was cooled to −5° C. in the exchanger 30 then expanded in the regulation valve 32 in order to form the carbon dioxide snow in the recipient 28. 4.2 kg of carbon dioxide snow laden with particles of caffeine were collected in a flask 40 open to the atmosphere, so that, after slow evaporation, for about 8 hours, of the carbon dioxide, 51 grams of a dry powder of caffeine were finally obtained. A granulometric analysis of this powder, effected by a method of granulometry by laser, showed that 90% of the particles presented a particularly fine size included between 1.2 $\mu$m and 4.8 $\mu$m.

EXAMPLE 2

In a second example of embodiment of the invention, very fine particles of tetracycline were generated according to the so-called SAS anti-solvent method. One thus pulverized a solution of 5% by mass of tetracycline in N-methylpyrrolidone with a flowrate of 0.6 kg/hr. in a stream of 15 kg/hr. of carbon dioxide at supercritical pressure, namely at a pressure of 18 MPa and at a temperature of 45° C., and this for 60 minutes.

One proceeded as previously except that, after the production of the particles was stopped and before the flux of carbon dioxide at supercritical pressure was reversed, the atomization chamber 1 continued to be swept with the latter for 15 minutes, so as to eliminate the solvent.

3.1 kg of carbon dioxide snow were collected in a flask 40 open to the atmosphere, so that, after evaporation of the carbon dioxide, 28.2 grams of fine, dry and non-agglomerated powder were obtained, of which a granulometric analysis showed that 90% of the particles presented a dimension included between 0.7 $\mu$m and 2.4 $\mu$m. An analysis by gaseous phase chromatography showed that the content of N-methylpyrrolidone in this powder was 140 ppm.

Figure 2:
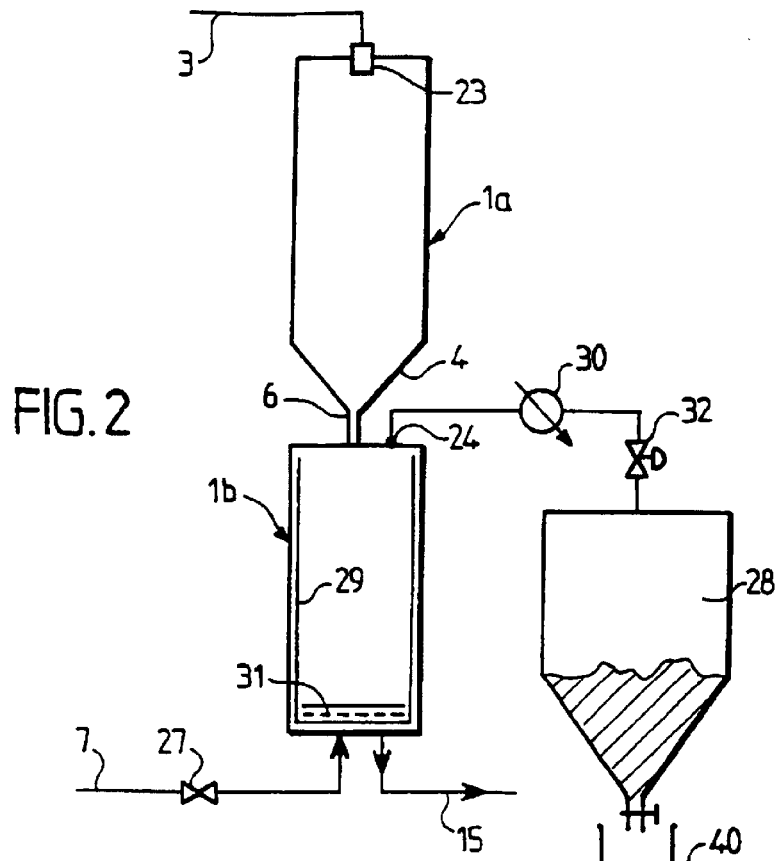

In a form of embodiment of the invention shown in FIG. 2, the atomization chamber 1 has been divided into two distinct chambers, namely an atomization chamber 1a proper, where the fine particles are produced, and a capture chamber 1b where the fine particles produced are captured by the filtering material 31. The chamber 1a comprises a conical bottom 4 and communicates by the latter with the upper part of the capture chamber 1b, through a pipe 6.

Such a form of embodiment is particularly advantageous in the domain of industrial exploitation. It makes it possible to work on a plurality of atomization chambers and a plurality of capture chambers, which are used and cleaned successively.

Figure 3:
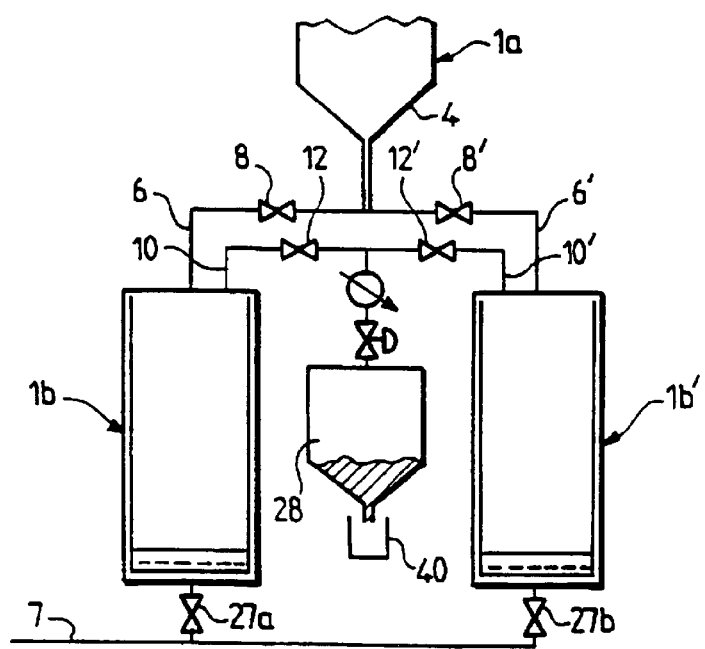

FIG. 3 thus shows such a form of embodiment, in which the atomization chamber 1a is in communication, by its bottom 4, with the upper part of two capture chambers 1b and 1b' through respective pipes 6 and 6' with the interposition of valves 8 and 8'. The installation comprises a common receptor chamber 28, of which the upper part is respectively in communication with the upper parts of the two capture chambers 1b and 1b' through pipes 10 and 10' with the interposition of valves 12 and 12'.

By playing on the positions of the valves 8, 8' and 12, 12', it is possible to alternate, during the process, that of the two receptor chambers which will be connected to the atomization chamber 1a, with a periodicity as a function of the work to be effected. Such an installation was used for capturing particles of caffeine. Particles were thus generated for 4 hours, then one proceeded as described previously, successively using each of the two capture chambers 1b and 1b' for periods of one hour. 17.2 kg of carbon dioxide snow were thus collected, which furnished 251 g of caffeine in the form of a dry and non-agglomerated powder of which the particles present a morphology and granulometric spectrum close to those obtained in Example 1.

What is claimed is:

1. A method for capturing particles having a diameter of about 0.1 $\mu$m to 1 mm, wherein the particles are present in a fluid flow in the liquid, gaseous or supercritical state, characterized in that it comprises the steps consisting in:

causing this flux to pass through a filtering element (31);

stopping the emission of this flux;

countercurrent sweeping the filtering material (31) with a carbon dioxide flow under pressure, so as to entrain the particles deposited on the filtering material (31);

expanding the flow, so as to trap the particles within a solid carbon dioxide snow-type mixture formed during its expansion.

2. The method according to claim 1, characterized in that the carbon dioxide flow used during sweeping is at supercritical pressure.

3. The method according to claim 1, characterized in that, before expansion, the carbon dioxide flow is cooled.

4. The method according to claim 1, characterized in that, before countercurrent sweeping, one percolates, in the normal direction of the flux, the particles collected by the filtering element with a fluid at supercritical pressure.

5. The method according to claim 1, characterized in that one effects expansion of the flow in countercurrent at a pressure close to atmospheric pressure.

6. The method according to claim 1, characterized in that said solid mixture trapped is evaporated so as to recover the particles.

7. The method according to claim 1, characterized in that the flux of fluid within which the particles are dispersed is sent successively in periodic manner towards a plurality of capture chambers, the particle producing operation being carried out continuously.

* * * * *